US011572839B2

(12) United States Patent
Van Gansen et al.

(10) Patent No.: US 11,572,839 B2
(45) Date of Patent: Feb. 7, 2023

(54) TURBOMACHINE FOR AIRCRAFT COMPRISING A PLURALITY OF VARIABLE BYPASS VALVES AND CONTROL METHOD

(71) Applicant: SAFRAN AIRCRAFT ENGINES, Paris (FR)

(72) Inventors: Mathieu Daniel Marie Van Gansen, Moissy-Cramayel (FR); Lise Jeanne Bernadette Guillot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 58 days.

(21) Appl. No.: 17/256,600

(22) PCT Filed: Jul. 2, 2019

(86) PCT No.: PCT/EP2019/067709

§ 371 (c)(1),
(2) Date: Dec. 28, 2020

(87) PCT Pub. No.: WO2020/007847

PCT Pub. Date: Jan. 9, 2020

(65) Prior Publication Data

US 2021/0270192 A1    Sep. 2, 2021

(30) Foreign Application Priority Data

Jul. 6, 2018 (FR) ........................................ 1856232

(51) Int. Cl.
*F02C 9/18* (2006.01)
*B64D 27/02* (2006.01)
(Continued)

(52) U.S. Cl.
CPC ................ *F02C 9/18* (2013.01); *B64D 27/02* (2013.01); *F02C 3/04* (2013.01); *F02C 6/20* (2013.01);
(Continued)

(58) Field of Classification Search
CPC ...... F02C 9/18; F02C 9/16; F02C 3/04; F02C 6/20; F02K 3/075; B64D 27/02; F05D 2220/323; F04D 27/0207; F04D 27/0215
See application file for complete search history.

(56) References Cited

U.S. PATENT DOCUMENTS

| 3,638,428 A | * | 2/1972 | Shipley | F02K 3/075 |
| | | | | 415/149.1 |
| 2008/0001039 A1 | * | 1/2008 | Winter | F02K 3/075 |
| | | | | 244/53 R |
| 2018/0252184 A1 | * | 9/2018 | Hatim | F02K 3/075 |

FOREIGN PATENT DOCUMENTS

| CA | 2208801 A1 | 12/1998 | |
| FR | 2983911 A1 * | 6/2013 | ........... F01D 17/105 |

(Continued)

OTHER PUBLICATIONS

English translation of FR 2983911 A1, provided by Espacenet (Year: 2013).*

(Continued)

*Primary Examiner* — Thomas P Burke
(74) *Attorney, Agent, or Firm* — KOS IP Law LLP (57) ABSTRACT

A turbomachine for an aircraft extending axially along an axis X comprising a primary flow path in which an air stream flows intended for the combustion chamber and a secondary flow path in which an air stream flows intended for propulsion, the compressor comprising a plurality of first variable bypass valves, a plurality of second variable bypass valves, the turbomachine comprising a first control system configured to control the movement of the plurality of first (Continued)

variable bypass valves and a second control system configured to control the movement of the plurality of second variable bypass valves, the first control system and the second control system being separate.

11 Claims, 5 Drawing Sheets

(51) Int. Cl.
    *F02C 3/04*         (2006.01)
    *F02C 6/20*         (2006.01)
    *F02K 3/075*       (2006.01)
(52) U.S. Cl.
    CPC ........ *F02K 3/075* (2013.01); *F05D 2220/323* (2013.01)

(56) References Cited

FOREIGN PATENT DOCUMENTS

| FR | 2983911 A1 | 6/2013 |
|---|---|---|
| WO | WO 2008/147260 A1 | 12/2008 |

OTHER PUBLICATIONS

Search Report from French Intellectual Property Office on corresponding FR application (FR1856232) dated Mar. 26, 2019.
International Search Report and Written Opinion on corresponding PCT application (PCT/EP2019/067709) from International Searching Authority (EPO) dated Sep. 13, 2019.

\* cited by examiner

TURBOMACHINE FOR AIRCRAFT COMPRISING A PLURALITY OF VARIABLE BYPASS VALVES AND CONTROL METHOD

TECHNICAL FIELD

The present invention relates to the control of bypass valves of a compressor of a turbomachine of an aircraft.

In a known manner, an aircraft comprises one or more turbomachines to enable propulsion of the aircraft. A turbomachine axially extends along an axis X and comprises a compressor, a combustion chamber and a turbine. The turbomachine comprises a primary flow path in which an air flow for the combustion chamber circulates and a secondary flow path in which an air flow for propulsion circulates.

In order to avoid an operability failure of the turbomachine, in particular a stall phenomenon of the turbomachine, it is known to bypass part of the air flow circulating in the primary flow path into the secondary flow path. For this purpose, the compressor of the turbomachine comprises a plurality of variable bypass valves, or "VBV".

Each variable bypass valve is configured to move between a closed position, in which circulation from the primary flow path to the secondary flow path is prohibited, and an open position in which circulation from the primary flow path to the secondary flow path is permitted. In the open position, a primary air flow is bypassed into the secondary flow path, which lowers the pressure in the compressor and avoids the pumping phenomenon. Furthermore, in the open position, the variable bypass valves also allow the ejection of centrifugal debris present in the primary flow (water, sand, dust, ice, hail, organic tissue as a result of bird injection, etc.).

Furthermore, ice can also accumulate in the turbomachine and it is known to move the variable bypass valves several times between their open and closed positions to release the accumulated ice before the accumulation reaches a critical size and/or mass that could damage the turbomachine and/or affect the operation thereof.

In practice, variable bypass valves are simultaneously moved by a control system that comprises a peripheral transmission ring. Also, to release accumulated ice, the variable bypass valves are moved several times between their open and closed positions. This has the drawback that, for periods of time, all the bypass valves are in the closed position. The primary flow path is thereby no longer bypassed during these short periods of time and this can lead to the turbomachine stall.

One of the purposes of the present invention is to enable the primary flow path of the turbomachine to be bypassed when the operating conditions so require, while at the same time enabling any ice accumulation to be discharged.

An immediate solution to eliminate this drawback would be to provide dedicated means for ice removal, but this would have a negative impact on the overall space and mass of the turbomachine. Therefore, such a solution cannot be retained.

The purpose of the invention is therefore to overcome these drawbacks by providing a turbomachine with improved control of the variable bypass valves.

Document FR2983911A1 relates to an aircraft engine comprising first, upstream and second, downstream doors for bypassing the compressor. The variable bypass valves do not extend in the same plane transverse to the axis X in order to allow an air flow between the first door and the second door to pass therethrough. Such valves have a large longitudinal overall space.

SUMMARY

For this purpose, the invention relates to a turbomachine of an aircraft axially extending along an axis X and comprising a compressor, a combustion chamber and a turbine for driving the compressor, the turbomachine comprising a primary flow path in which an air flow for the combustion chamber circulates and a secondary flow path in which an air flow for propulsion circulates, the compressor comprising a plurality of first variable bypass valves, a plurality of second variable bypass valves, the variable bypass valves extending in a single plane transverse to the axis X, each variable bypass valve being configured to move between a closed position, in which circulation of an air flow from the primary to the secondary flow path is prohibited, and an open position in which circulation of an air flow from the primary flow path to the secondary flow path is permitted.

The invention is remarkable in that it comprises a first control system configured to control the movement of the plurality of first variable bypass valves and a second control system configured to control the movement of the plurality of second variable bypass valves, the first control system and the second control system being independent so as to independently control the plurality of first variable bypass valves and the plurality of second variable bypass valves.

By virtue of the invention, the first variable bypass valves and the second variable bypass valves can be alternately controlled, which is advantageous for removing ice accumulation while keeping at the same time compressor bypass. Advantageously, there is no need for providing means dedicated to ice removal. Only the control of the variable bypass valves needs to be advantageously modified. The presence of two control systems additionally increases the reliability of the turbomachine in case of dysfunction.

Preferably, the first control system comprises:
- a first transmission ring that extends in a plane transverse to the axis X of the turbomachine,
- a first engine device configured to rotate the first transmission ring about the axis X by a predetermined angle, and
- a plurality of first actuation mechanisms connected to the first transmission ring, each first variable bypass valve being connected to a first actuation mechanism.

Such a system is advantageous for simultaneously controlling the first bypass valves in order to homogenously bypass the compressor at its periphery. Advantageously, the first control system is configured to adjust the opening degree of the variable bypass valves according to the angular position of the transmission ring.

Preferably, the second control system comprises:
- a second transmission ring that extends in a plane transverse to the axis X of the turbomachine,
- a second engine device configured to rotate the second transmission ring about the axis X by a predetermined angle,
- a plurality of second actuation mechanisms connected to the second transmission ring, each second variable bypass valve being connected to a second actuation mechanism.

The first control system and the second control system have similar structures, thereby ensuring similar kinematics when opening or closing. This is particularly advantageous when the first variable bypass valves and the second variable bypass valves are simultaneously controlled.

Preferably, the first actuation mechanisms and the second actuation mechanisms are at the same radial distance from the axis X. This advantageously ensures similar kinematics when opening and closing.

Preferably, the first variable bypass valves and the second variable bypass valves are alternately disposed at the periphery of the primary flow path. Alternate positioning of the bypass valves allows a substantially homogeneous bypass at the periphery even if only the first variable bypass valves or only the second variable bypass valves are open.

Preferably, the first transmission ring extends radially outwardly of the second transmission ring. The use of transmission rings having different dimensions allows the axial overall space in the turbomachine to be limited.

Preferably, the first transmission ring comprises a plurality of first connection members connected to the first actuation mechanisms respectively, the second transmission ring comprises a plurality of second connection members connected to the second actuation mechanisms respectively, the first connection members and the second connection members are at the same radial distance from the axis X of the turbomachine. Thus, the control kinematics of the variable bypass valves is advantageously similar for both control systems. This ensures optimum simultaneous control of the first and second variable bypass valves.

Preferably, the first transmission ring is rotatably guided relative to the second transmission ring. Such guidance enables improvement in the robustness of the whole and in the control accuracy.

According to one aspect of the invention, the first transmission ring and the second transmission ring extend in the same plane transverse to the axis X. This has the advantage of limiting the axial overall space.

According to another aspect of the invention, the first transmission ring is axially offset along the axis X with respect to the second transmission ring. This advantageously makes it possible to adapt to the shape of the flow paths of the turbomachine.

Preferably, since the compressor comprises a plurality of third variable bypass valves, the variable bypass valves extending in a single plane transverse to the axis X, the turbomachine comprises a third control system configured to control the movement of the plurality of third variable bypass valves, the first, second and third control systems being independent so as to independently control the plurality of first variable bypass valves, the plurality of second variable bypass valves and the plurality of third variable bypass valves. The use of three sets of variable bypass valves provides flexibility and keeps high bypass when one of the sets of variable bypass valves is defrosting.

Preferably, each first actuation mechanism comprises at least one rotary bell crank. Further preferably, each drive mechanism comprises at least one rotary bell crank.

The invention also relates to a method for controlling the movement of the variable bypass valves of a turbomachine as set forth above, the method comprising:
- a step of opening the first variable bypass valves by the first control system at a first time t1, and
- a step of opening the second variable bypass valves by the second system control at a second time t2, different from the first time t1.

Such a method for alternately controlling the first variable bypass valves and the second variable bypass valves enables an optimal defrosting of a compressor while simultaneously allowing partial bypass of the compressor.

BRIEF DESCRIPTION OF THE DRAWINGS

The invention will be better understood upon reading the following description, given only by way of example, and referring to the appended drawings in which.

It should be noted that the figures disclose the invention in a detailed way in order to implement the invention, said figures can of course be used to better define the invention if necessary.

DETAILED DESCRIPTION

Figure 1:
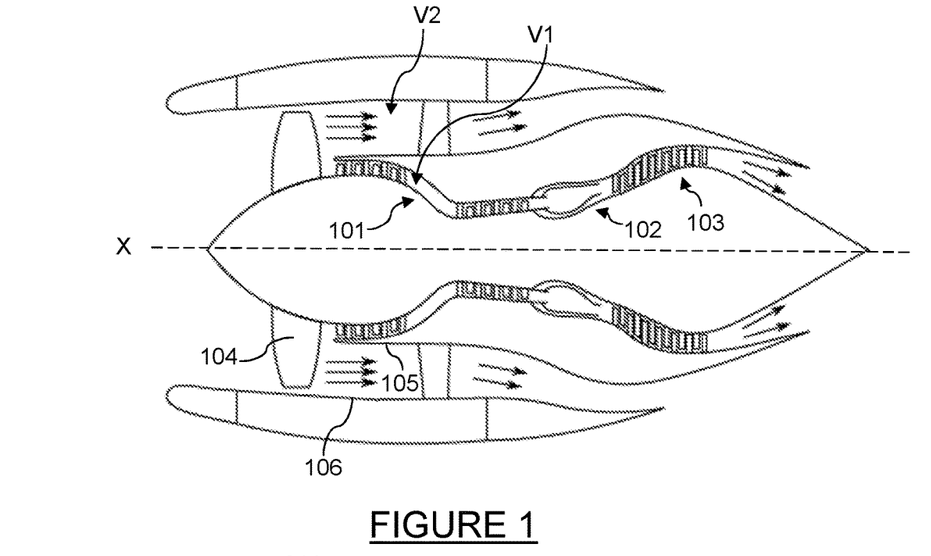
FIG. 1 is a general schematic representation of a turbomachine according to the invention.

As illustrated in FIG. 1, a turbomachine extends longitudinally along an axis X and allows the aircraft to be moved from an air flow entering the turbomachine and circulating from upstream to downstream. In the following, the terms "upstream" and "downstream" are defined in relation to the axis X oriented from upstream to downstream. Analogously, the terms "internal" and "external" are defined in the radial direction with respect to the longitudinal axis X. The turbomachine comprises an upstream fan 104, an internal shell 105 and an external shell 106.

The fan 102 is rotatably driven about the axis X of the turbomachine in order to suck in an air flow that is separated by the internal shell 105 between a first air flow for driving the turbomachine, called the primary flow, and a second, thrust air flow, called a secondary flow. The internal shell 105 extends substantially along the axis X of the turbomachine and the external shell 106 extends externally to the internal shell 105. The primary air flow extends internally to the internal shell 105 in a primary flow path V1, while the secondary flow path extends externally to the internal shell 105 in a secondary flow path V2. The internal shell 105 and the external shell 106 delimit the secondary air flow V2 for circulation of the secondary air flow.

The turbomachine comprises a compressor 101 to accelerate the primary flow, a combustion chamber 102 to energize it and a turbine 103 driven by the energized air flow in order to drive the compressor 101.

In order to avoid an operability failure of the turbomachine, in particular a pumping/stall phenomenon of the turbomachine, the compressor comprises a plurality of first variable bypass valves 1A and a plurality of second variable bypass valves 1B. Each variable bypass valve 1A, 1B is configured to move between a closed position, in which circulation of an air flow from the primary flow path V1 to the secondary flow path V2 is prohibited, and an open position in which circulation of an air flow from the primary flow path V1 to the secondary flow path V2 is permitted. The variable bypass valves 1A, 1B extend in a same plane transverse to the axis X so as to peripherally bypass the primary flow path.

Figure 2:
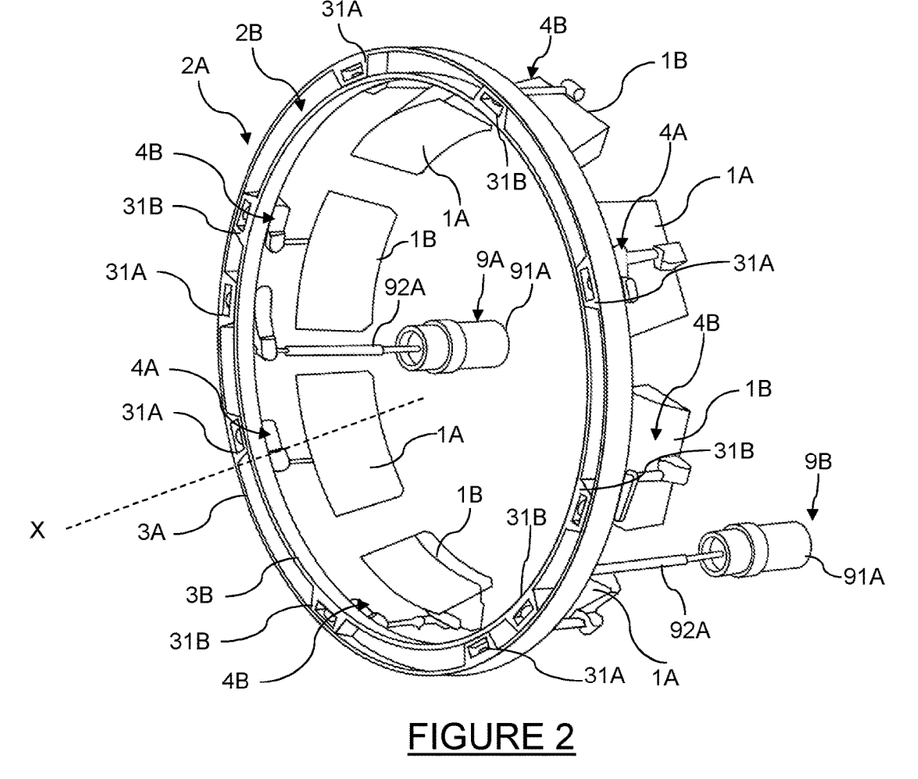
FIG. 2 is a schematic perspective representation of the control systems of the variable bypass valves of the turbomachine of FIG. 1 according to a first embodiment.

According to the invention, with reference to FIG. 2, the turbomachine comprises a first control system 2A configured to control the movement of the first variable bypass valves 1A and a second control system 2B configured to control the movement of the second variable bypass valves 1B, the first control system 2A and the second control system 2B being independent of each other.

Since the control systems 2A, 2B are independent, the bypass valves 1A, 1B can be alternately controlled, that is in a time offset manner and no longer simultaneously as in prior art. For example, the first variable bypass valves 1A can be opened while the second variable bypass valves 1B are closed. This is particularly advantageous for discharging ice accumulation while limiting the risk of turbomachine pumping. During ice removal, there is no longer a short period of time during which the bypass valves 1A, 1B are necessarily closed simultaneously.

The control systems 2A, 2B are pneumatically or electrically controlled to enable selective opening/closing. In the case of pneumatic control, the turbomachine can comprise a pneumatic circuit for each control system 2A, 2B and a regulating valve for selectively supplying each pneumatic circuit.

Advantageously, in case of failure of one of the control systems 2A, 2B, the other control system remains operational, thus increasing reliability of the turbomachine.

With reference to FIG. 2, according to a first embodiment, the turbomachine comprises only first variable bypass valves 1A and second variable bypass valves 1B. The first variable bypass valves 1A and the second variable bypass valves 1B are alternating at the periphery of the primary flow path V1 and extend in a same plane transverse to the axis X of the turbomachine.

In this example, the turbomachine comprises four first variable bypass valves 1A and four second variable bypass valves 1B. Preferably, the turbomachine has the same number of first variable bypass valves 1A and second variable bypass valves 1B. Of course, the numbers of first/second variable bypass valves 1A, 1B could be different.

In accordance with the invention, the turbomachine comprises a first control system 2A configured to control the movement of the first variable bypass valves 1A and a second control system 2B configured to control the movement of the second variable bypass valves 1B.

In this example, the first control system 2A comprises a peripheral shaped first transmission ring 3A extending in a plane transverse to the axis X of the turbomachine, a first engine device 9A configured to rotate the first transmission ring 3A about its axis X by a predetermined angle, preferably helically, and a plurality of first actuation mechanisms 4A connected to the first transmission ring 3A, each first variable bypass valve 1A being connected to a first actuation mechanism 4A. As such, when the first engine device 9A is activated, the first variable bypass valves 1A are moved simultaneously.

Analogously, the second control system 2A comprises a second peripheral transmission ring 3B that extends in a plane transverse to the axis X of the turbomachine, a second engine device 9B configured to rotate the first transmission ring 3B about its axis X by a predetermined angle, and a plurality of second actuation mechanisms 4B connected to the second transmission ring 3B, each second variable bypass valve 1B being connected to a second actuation mechanism 4B. Analogously, when the second engine device 9B is activated, the second variable bypass valves 1B are simultaneously moved.

Advantageously, each control system 2A, 2B allows simultaneous control of several variable bypass valves 1A, 1B that are peripherally distributed. Thus, when the first variable bypass valves 1A or the second variable bypass valves 1B are bypassed, the bypass is balanced and distributed, which enables optimum bypass and reduction in the pumping risk.

Preferably, the actuation mechanisms 4A, 4B and engine devices 9A, 9B are positioned downstream of the transmission rings 3A, 3B in order to limit the overall space.

Preferably, each transmission ring 3A, 3B remains centered and in a plane transverse to the axis X during motion kinematics. The rigidity of each transmission ring 3A, 3B ensures that it does not deform under stresses. Preferably, the guidance of each transmission ring 3A, 3B is provided by shoes or calibrated connecting interfaces.

Preferably, the transmission rings 3A, 3B are configured to rotate about the axis X in opposite directions when opening or closing simultaneously. Of course, rotation in the same direction could also be suitable.

Each transmission ring 3A, 3B has a peripheral shape and extends orthogonally to the axis X along which the turbomachine extends.

In this example, with reference to FIG. 2, the transmission rings 3A, 3B extend in the same plane transverse to the axis X. The first transmission ring 3A has a larger diameter than the diameter of the second transmission ring 3B. The first transmission ring 3A and the second transmission ring 3B are coaxial with each other, with the first transmission ring 3A extending radially outwardly of the second transmission ring 3B.

Figure 6:
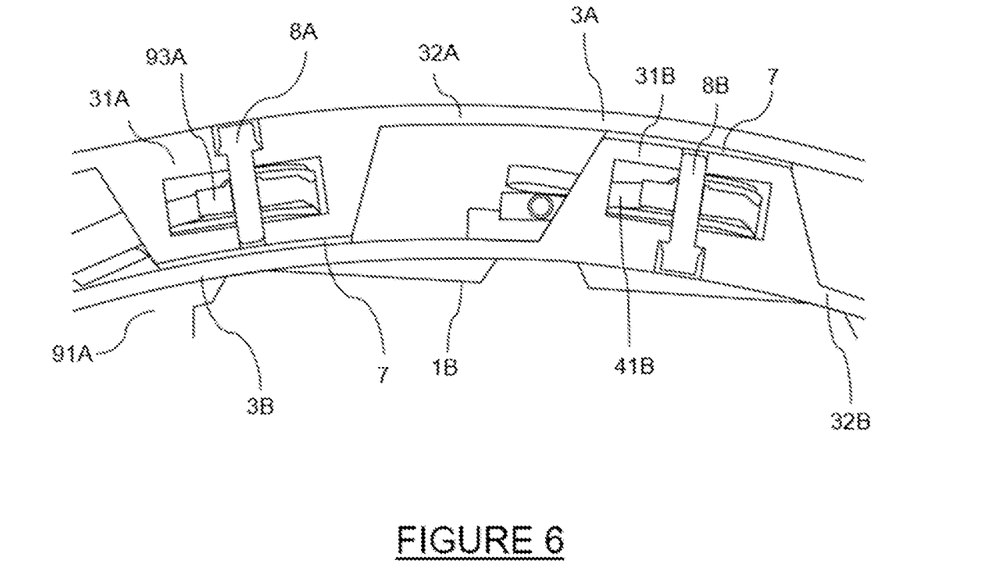
FIG. 6 is a transverse cross-sectional view of the control systems from upstream of the turbomachine.

The first transmission ring 3A is rotatably mounted relative to the second transmission ring 3B. With reference to FIG. 6, each transmission ring 3A, 3B comprises guide means 7, especially festoons or shoes, in order to allow the transmission rings 3A, 3B to rotatably move relative to each other about the axis X. Preferably, the guide means 7 are formed at the interfaces between the transmission rings 3A, 3B, in particular, at the end of their connection members 31A, 31B. Such guidance improves robustness of the control kinematics over time.

Figure 3:
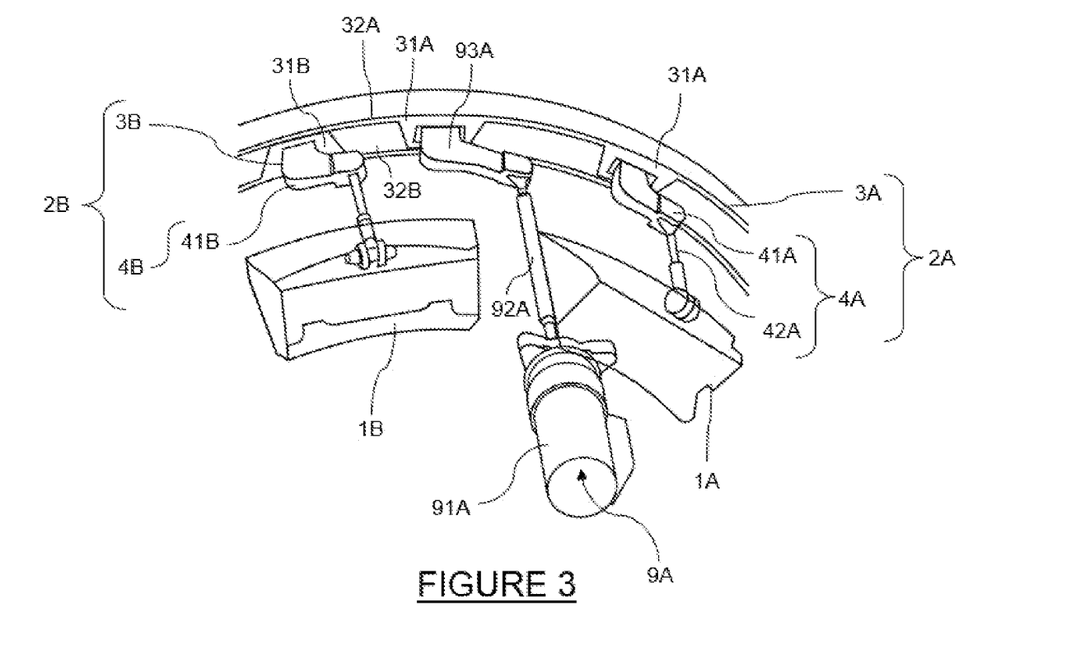
FIG. 3 is a close-up representation of the control systems in FIG. 2.

As illustrated in FIG. 3, the first transmission ring 3A comprises an annular part 32A from which several first connection members 31A extend radially inward, allowing the connection with the first engine device 9A but also with the first actuation mechanisms 4A. In this embodiment, as illustrated in FIG. 2, the first transmission ring 3A comprises five first connection members 31A (one to connect each first variable bypass valve 1A and one to connect the first engine device 9A).

Figure 5:
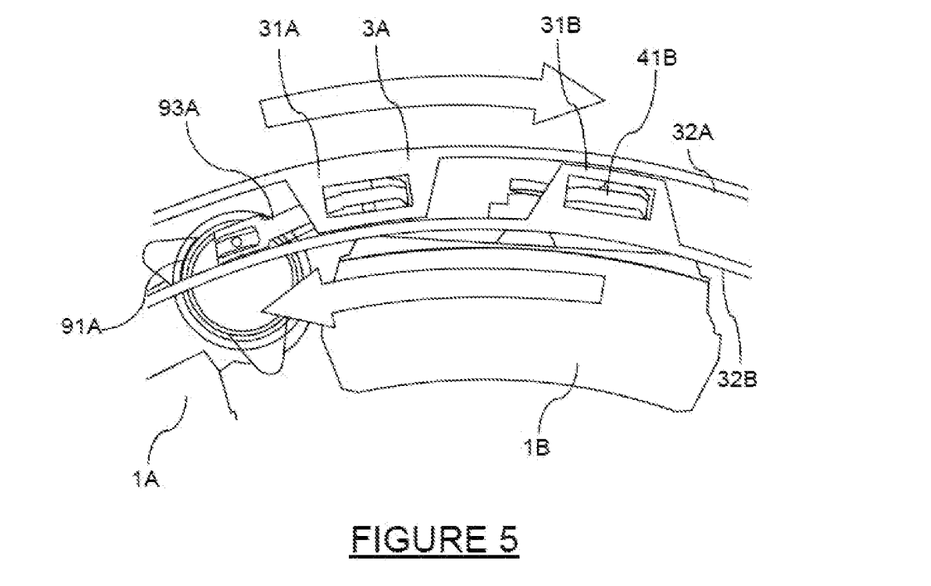
FIG. 5 is a view of the control systems from upstream of the turbomachine.

With reference to FIGS. 5 and 6, each first connection member 31A has a substantially parallelogram shape comprising a base wall integral with the annular part 32A and a head wall substantially parallel to the base wall. The base wall is connected to the head wall by two walls that converge towards the head wall as illustrated in FIGS. 5 and 6. In other words, the head wall has a smaller dimension than the base wall in order to limit friction with the second transmission ring 3B.

In addition, each first connection member 31A comprises an opening, extending in parallel to the axis X, in which a first actuator 4A or a first engine device 9A is mounted. Preferably, with reference to FIG. 6, mounting a first actuator 4A or a first engine device 9A is achieved by radially inwardly inserting a first attachment member 8A.

Analogously, the second transmission ring 3B comprises an annular part 32B from which several second connection members 31B extend radially outwardly for connection to the second engine device 9B and also to the second actuation mechanisms 4B. In this embodiment, as illustrated in FIG. 2, the second transmission ring 3B comprises five second connection members 31B (one to connect each second variable bypass valve 1B and one to connect the second engine device 9B).

Each second connection member 31B comprises an opening, extending in parallel to the axis X, in which a second actuation mechanism 4B or a second engine device 9B is mounted. Preferably, with reference to FIG. 6, mounting a second actuation mechanism 4B or a second engine device 9B is achieved by inserting a second connection member 8B radially outwardly.

The second transmission ring 3B is nested in the first transmission ring 3A in the same transverse plane. Preferably, the first connection members 31A and the second connection members 31B, connected to the variable bypass valves 1A, 1B, are alternately disposed peripherally. Preferably, the first connection members 31A and the second connection members 31B extend at the same radial distance from the axis X in order to limit the overall space and allow similar control kinematics for the transmission rings 3A, 3B.

In this example preferably the first engine device 9A and second engine device 9B are also identical, for the sake of clarity and brevity, only the first engine device 9A will be set forth in further detail.

Figure 4:
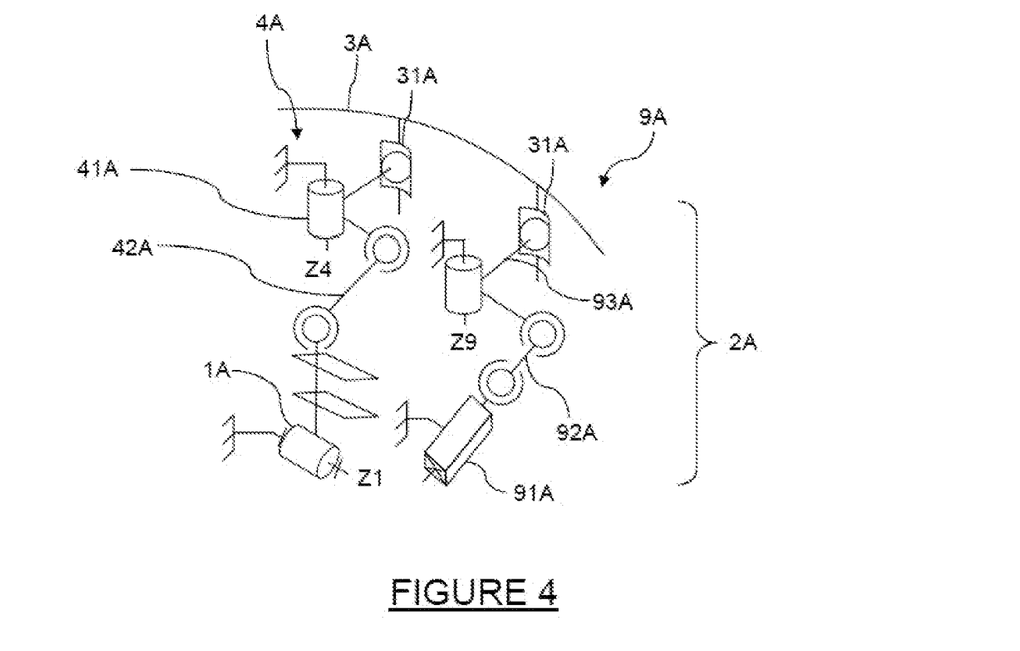
FIG. 4 is a functional diagram of a control system according to the invention.

In this example, with reference to FIGS. 4 to 6, the first engine device 9A comprises a controllable cylinder 91A configured to extend along an axis parallel to the axis X of the turbomachine, a connecting rod 92A connected to the controllable cylinder 91A and a bell crank 93A connecting the connecting rod 92A to the first transmission ring 3A, in particular, to a first connection member 31A. A bell crank 93A advantageously enables the longitudinal motion of the controllable cylinder 91A to be converted into a tangential motion in order to rotatably drive the first transmission ring 3A about the axis X by a rotation angle that is a function of the stroke of the first controllable cylinder 91A. As illustrated in FIG. 4, the bell crank 93A is rotatably mounted about an axis Z9 in the turbomachine. It goes without saying that the first engine device 9A could have different forms.

Alternatively, a first engine device 9A could be provided comprising a controllable cylinder 91A configured to extend along an axis orthogonal to the axis X of the turbomachine, in particular, tangentially to the first transmission ring 3A.

In this example preferably, the first actuation mechanisms 4A and the second actuation mechanisms 4B are also identical, for the sake of clarity and brevity, only the first actuation mechanisms 4A will be set forth in detail. Like elements between the first and second actuation mechanisms 4A, 4B have been identified with like reference characters, except for their respective series "A" and series "B" designations.

In this example, with reference to FIGS. 4 to 6, the first actuation mechanism 4A comprises a bell crank 41A connected to the first transmission ring 3A, in particular, to a first connection member 31A, a connecting rod 42A connecting the bell crank 41A to a first variable bypass valve 1A in order to pivot it about a hinge axis Z1 orthogonal to the axis X. As illustrated in FIG. 4, the bell crank 41A is rotatably mounted about an axis Z4 in the turbomachine. It goes without saying that the first actuation mechanism 9A could have different forms.

Thus, controlling the first actuation mechanism 9A allows simultaneous adjustment of the degree of opening of all the first variable bypass valves 1A. Analogously, controlling the second engine device 9B can simultaneously adjust the opening degree of all the second variable bypass valves 1B. When the control kinematics of the variable bypass valves 1A, 1B are identical, this allows all the variable bypass valves to be controlled identically, namely as if they were controlled by one and a single control system as in prior art.

When the first engine device 9A and the second engine device 9B are not activated simultaneously, some of the variable bypass valves 1A, 1B are opened while others are closed (opening of the first variable bypass valves 1A at a first time t1 and then opening of the second variable bypass valves 1B at a second time t2). An alternate opening of the variable bypass valves 1A, 1B allows a possible ice accumulation in the turbomachine to be discharged without prohibiting bypassing of compressor 101. The drawbacks of prior art are thereby eliminated.

Several embodiments are set forth in FIGS. 7 to 11. For the sake of clarity and brevity, the elements of the first embodiment are not described again, only the structural and functional differences will be detailed. In addition, similar elements between the embodiments are referenced analogously.

Figure 7:
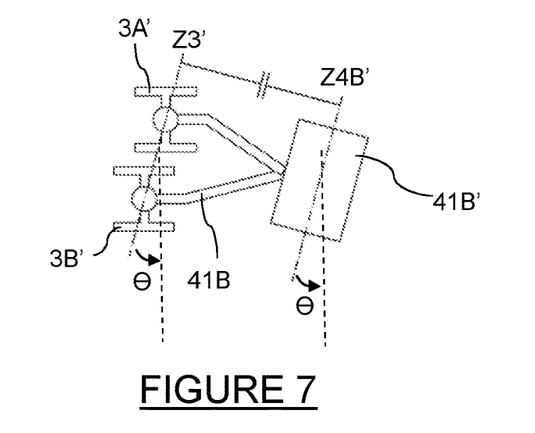
FIG. 7 is a schematic representation in a longitudinal cross-section view of a second embodiment of the control systems.
Figure 8:
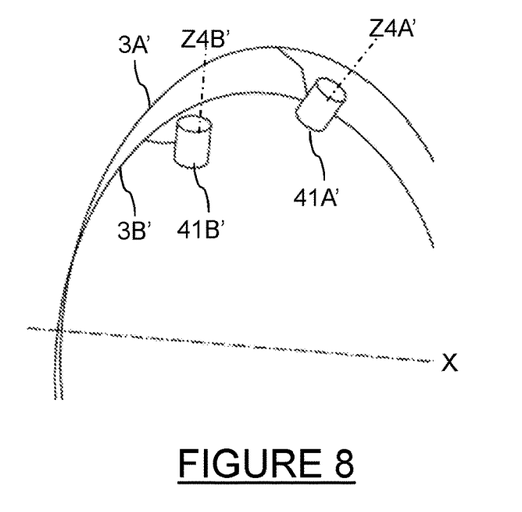
FIG. 8 is a schematic representation in a simplified perspective view of the second embodiment of the control systems.

According to a second embodiment, with reference to FIGS. 7 to 8, the transmission rings 3A', 3B' remain coaxial with each other but are not nested with each other but radially superimposed. The transmission rings 3A', 3B' are radially spaced so as to delimit an empty annular space between them. In other words, the first connection members 31A and the second connection members 31B extend at different radial distances from the axis X.

In this example, the transmission rings 3A', 3B' are axially offset along the axis X. Such a solution can be advantageous to limit the axial overall space of the control systems 3A', 3B' and achieve similar control kinematics.

With reference to FIG. 7, in a longitudinal section view along the axis X, the transmission rings 3A', 3B' are aligned along an alignment axis Z3' which forms an angle θ with the plane transverse to the axis X. Preferably the bell cranks 41A', 41B' connected to the transmission rings 3A', 3B' respectively are hinged on axes Z4A', Z4B', each axis Z4A', Z4B' forming an angle θ with the plane transverse to the axis X. This feature makes it advantageous to control the first variable bypass valves and the second variable bypass valves according to a same kinematics.

Figure 9:
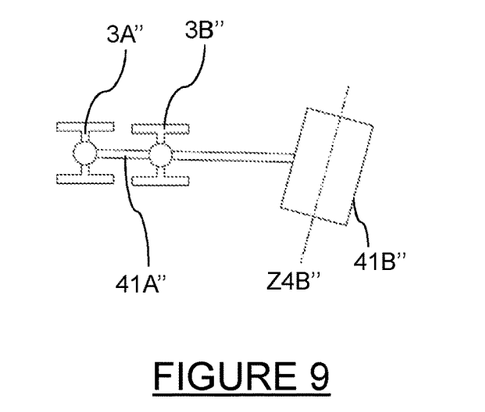
FIG. 9 is a schematic representation in a longitudinal cross-section view of a third embodiment of the control systems.

According to a third embodiment, with reference to FIG. 9, the transmission rings 3A", 3B" are no longer in the same transverse plane but are axially aligned along the axis X. In this example, the first transmission ring 3A" is mounted upstream of the second transmission ring 3B". The actuation mechanisms and engine devices are positioned downstream of the transmission rings 3A", 3B". In order to allow movement of the first transmission ring 3A" located furthest upstream, the second transmission ring 3B" comprises ports into which the bell cranks 41A" attached to the first transmission ring 3A" extend. The bell cranks 41B" are hinged on axes Z4B". This solution is advantageous to limit the overall space of the control systems. The transmission rings 3A", 3B" can be advantageously moved according to similar kinematics.

Figure 10:
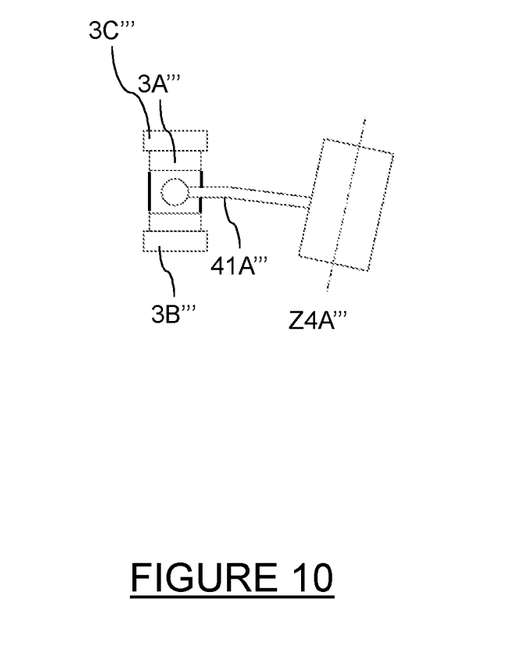
FIG. 10 is a schematic representation in a longitudinal cross-section view of a fourth embodiment of the control systems and FIG. 11 is a schematic representation in a transverse cross-sectional view of a fourth embodiment of the control systems.
Figure 11:
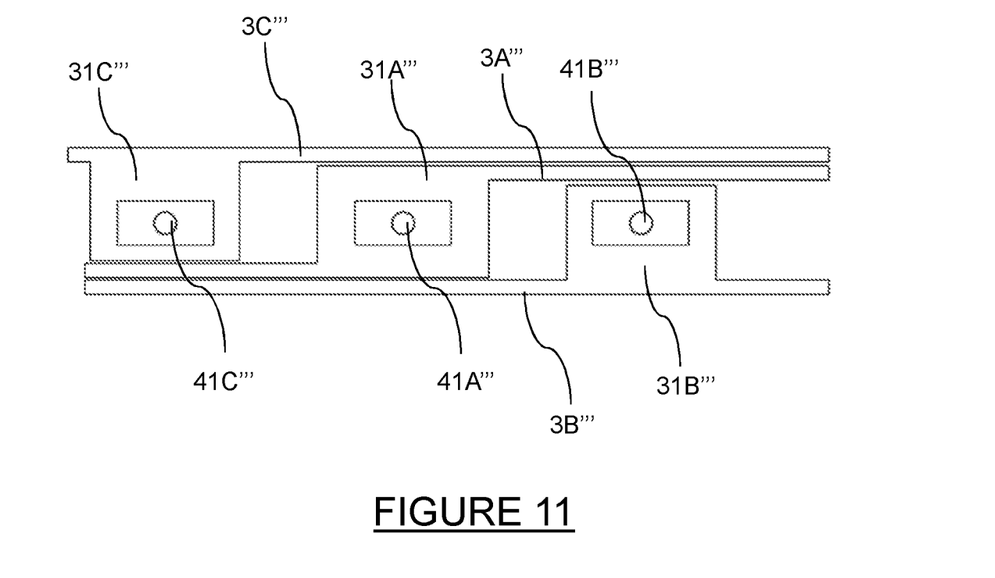

According to a fourth embodiment, the turbomachine comprises first variable bypass valves, second variable bypass valves and third variable bypass valves. The first, second and third variable bypass valves are alternating at the periphery of the primary flow path and extend in the same plane transverse to the axis X.

The turbomachine comprises a first control system configured to control the movement of the plurality of first variable bypass valves, a second control system configured to control the movement of the plurality of second variable bypass valves, and a third control system configured to control the movement of the plurality of third variable bypass valves.

With reference to FIGS. 10 to 11, the first control system comprises a first transmission ring 3A''', the second control system comprises a second transmission ring 3B''', and the third control system comprises a third transmission ring 3C'''. As shown, by way of example, the bell crank 41A''' connected to the transmission ring 3A''' is hinged on axis Z4A'''.

The transmission rings 3A''', 3B''', 3B''' are coaxial and extend in a same plane transverse to the axis X. The third transmission ring 3C''' extends radially outwardly of the first transmission ring 3A''' which in turn extends radially outwardly of the second transmission ring 3B''' as illustrated in FIGS. 10 and 11. With reference to FIG. 11, transmission rings 3A''', 3B''', 3C''' comprise connection members 31A''' respectively, 31B''', 31C''' which are at the same radial distance from the axis X in order to be able to control, according to analogous kinematics, the bell cranks 41A''', 41B''', 41C''' for actuation.

The use of three transmission rings 3A''', 3B''', 3C''' allows flexibility to be provided when bypassing the compressor 101 of the turbomachine. It goes without saying that the turbomachine could comprise more than three sets of variable bypass valves and as many associated control systems.

The invention claimed is:

1. A turbomachine for an aircraft extending axially along an axis, comprising:
    a combustion chamber;
    a primary flow path in which an air flow for the combustion chamber circulates and a secondary flow path in which an air flow for propulsion circulates;
    a compressor comprising a plurality of first variable bypass valves and a plurality of second variable bypass valves, the plurality of first variable bypass valves and the plurality of second variable bypass valves extending in a same plane transverse to the axis, each variable bypass valve being configured to move between a closed position, in which an air flow from the primary flow path to the secondary flow path is prohibited, and an open position in which an air flow from the primary flow path to the secondary flow path is permitted;
    a turbine for driving the compressor; and
    a first control system configured to control the movement of the plurality of first variable bypass valves and a second control system configured to control the movement of the plurality of second variable bypass valves, the first control system and the second control system being independent so as to independently control the plurality of first variable bypass valves and the plurality of second variable bypass valves,
    wherein the first control system comprises:
        a first transmission ring which extends in a plane transverse to the axis of the turbomachine;
        a first engine device configured to rotate the first transmission ring about the axis by a predetermined angle; and
        a plurality of first actuation mechanisms connected to the first transmission ring, each first variable bypass valve being connected to a respective first actuation mechanism of the plurality of first actuation mechanisms,
    wherein the second control system comprises:
        a second transmission ring which extends in a plane transverse to the axis of the turbomachine;
        a second engine device configured to rotate the second transmission ring about the axis by a predetermined angle; and
        a plurality of second actuation mechanisms connected to the second transmission ring, each second variable bypass valve being connected to a respective second actuation mechanism of the plurality of second actuation mechanisms,
    wherein the plurality of first variable bypass valves and the plurality of second variable bypass valves are alternating at a periphery of the primary flow path.

2. The turbomachine for an aircraft according to claim 1, wherein
    the plurality of first actuation mechanisms and the plurality of second actuation mechanisms are at a same radial distance from the axis.

3. The turbomachine for an aircraft according to claim 1, wherein the first transmission ring extends radially outwardly of the second transmission ring.

4. The turbomachine for an aircraft according to the claim 1, wherein the first transmission ring is rotatably guided relative to the second transmission ring.

5. The turbomachine for an aircraft according to the claim 1, wherein the first transmission ring and the second transmission ring extend in a same plane transverse to the axis.

6. The turbomachine for an aircraft according to claim 1, wherein the first transmission ring is axially offset along the axis relative to the second transmission ring.

7. The turbomachine for an aircraft according to claim 1, wherein the compressor comprises a plurality of third variable bypass valves, the plurality of third variable bypass valves extending in a same plane transverse to the axis.

8. A method for controlling the movement of the variable bypass valves of the turbomachine according to claim 1, the method comprising:
    a step of opening the plurality of first variable bypass valves by the first control system at a first time; and
    a step of opening the plurality of second variable bypass valves by the second control system at a second time which is different from the first time.

9. The turbomachine for an aircraft according to claim 7, further comprising a third control system configured to control a movement of the plurality of third variable bypass valves, the first control system, the second control system and the third control system being independent so as to independently control the plurality of first variable bypass valves, the plurality of second variable bypass valves and the plurality of third variable bypass valves.

10. A method of using the turbomachine of claim 1, comprising:
operating the turbine to drive the compressor.

11. The method of claim 10, further comprising using the first control system to control the movement of the plurality of first variable bypass valves and using the second control system to control the movement of the plurality of second variable bypass valves.

* * * * *